Figure 1:
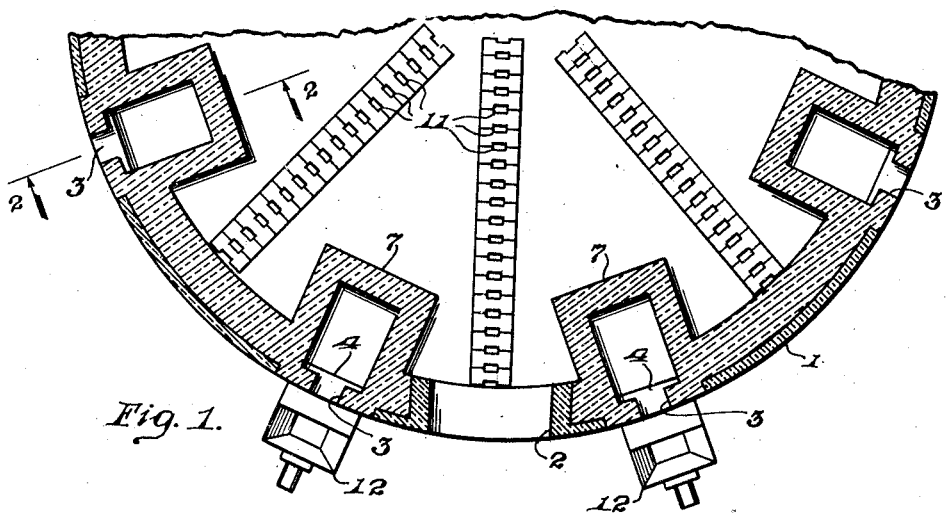

April 1, 1947. F. M. MILLER ET AL 2,418,272
AUTOMATIC MULTIPLE STOKER CONTROL
Filed June 9, 1943  4 Sheets—Sheet 1

INVENTORS
Fred M. Miller,
Alfred C. Shape,
William H. McClelland,
Gordon C. Fay.
BY
J. Stuart Freeman
ATTORNEY

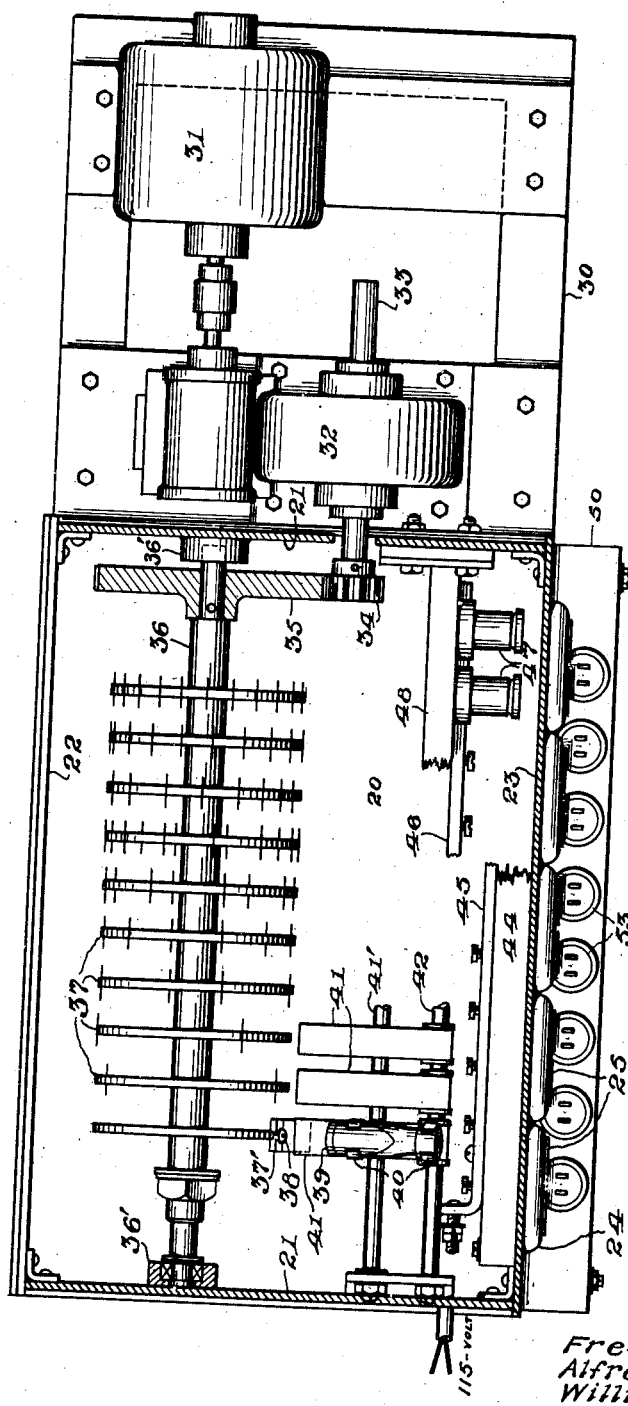

April 1, 1947.  F. M. MILLER ET AL  2,418,272
AUTOMATIC MULTIPLE STOKER CONTROL
Filed June 9, 1943  4 Sheets-Sheet 3
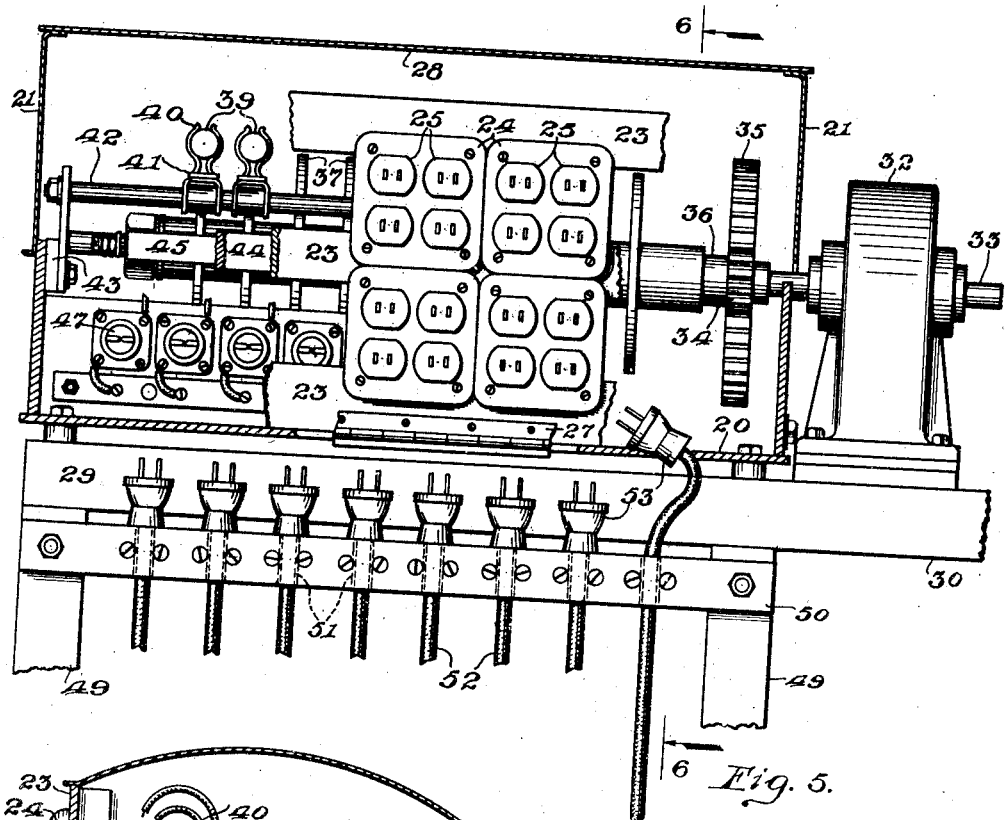
INVENTORS
Fred M. Miller,
Alfred C. Shape,
William H. McClelland,
Gordon C. Fay.
BY
J. Stuart Freeman
ATTORNEY

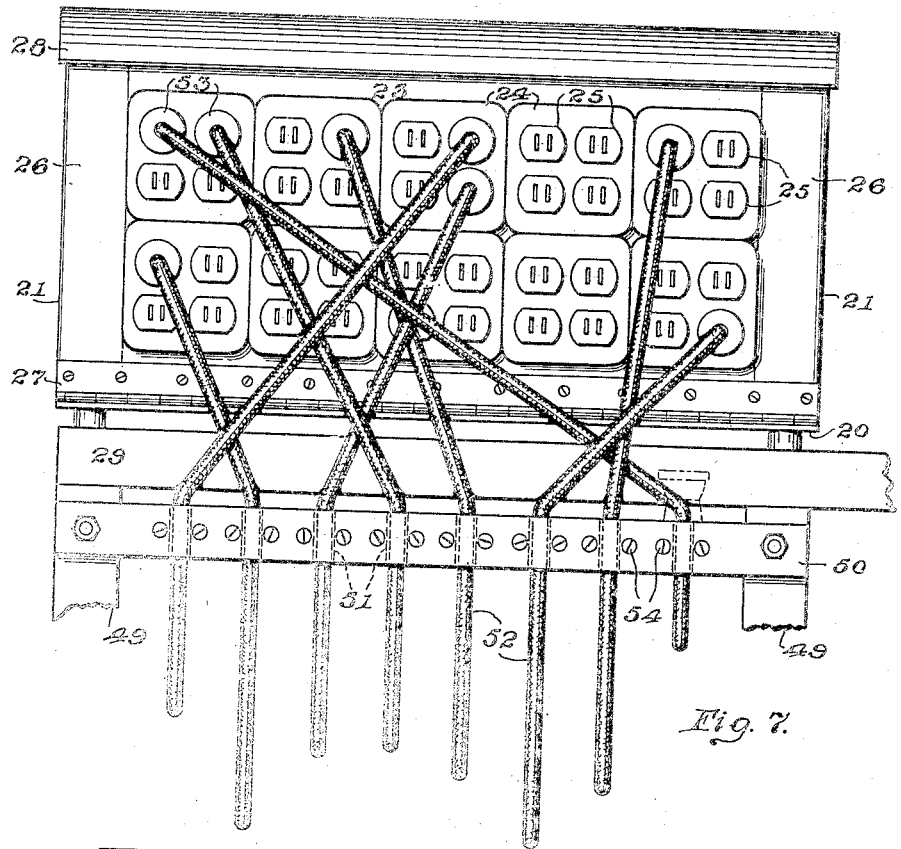
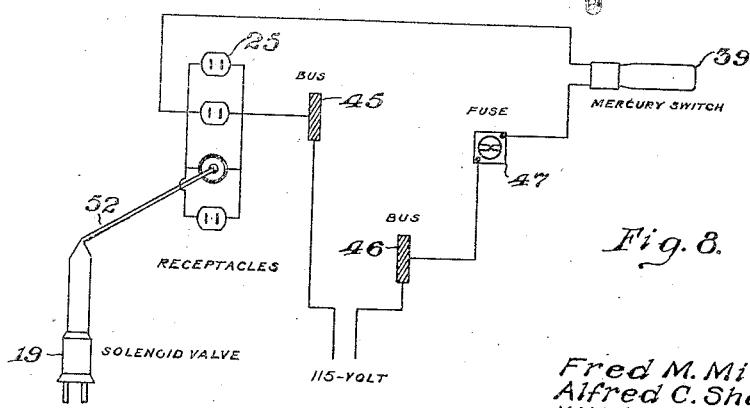
Fig. 7.
Fig. 8.
INVENTORS
Fred M. Miller,
Alfred C. Shape,
William H. McClelland,
Gordon C. Fay.
BY J. Stuart Freeman
ATTORNEY Patented Apr. 1, 1947

UNITED STATES PATENT OFFICE 2,418,272

2,418,272
AUTOMATIC MULTIPLE STOKER CONTROL

Fred M. Miller, Bala-Cynwyd, Alfred C. Shape, Upper Darby, William H. McClelland, Wynnewood, and Gordon C. Fay, Beechwood Park, Pa., assignors to General Refractories Company, Philadelphia, Pa., a corporation of Pennsylvania Application June 9, 1943, Serial No. 490,382

2 Claims. (Cl. 110—32)

The object of the invention is to provide improvements in mechanisms for firing a plurality of kilns or furnaces, each of which has a plurality of eyes or fuel inlets, into which it is necessary to feed solid, semi-solid, or liquid fuel in predetermined sequence and in various combinations, in order to heat the ceramic or other material at the proper rate of increase in temperature to the desired maximum, and for the proper period necessary in order to obtain the desired results for different types of materials, molded shapes and their various uses, as affected by changes in external temperatures, wind direction and velocity, and similar weather conditions, in fact, all uncontrollable extraneous factors generally.

Another object is to provide either commutation as such, or switch-actuating means, set to function at definite predetermined time intervals, and means to selectively connect the stokers, especially on a given kiln, so as to operate in any desired relationship independently of one another, and in accordance with the particular commutation or switch-actuating and timing element to which they may be selectively connected.

A further object is to provide the combination of a plurality of stokers, with either pneumatic, hydraulic, electric, or other suitable means for directly actuating them, electric means to control said actuating means, a set of commutators or switch-actuating means having different characteristic time intervals for functioning, and means to selectively connect any one or group of said control means to any one of said commutating or switch-actuating means, whereby corresponding stokers will operate at desired intervals and relationship with respect to one another.

Still another object is to provide in one embodiment of the invention improved timing means, comprising a set of rotatable elements preferably carried by the same shaft, means to rotate said shaft at any desired speed, but usually quite slowly, different numbers of lugs or equivalent tripping means carried by and preferably equally spaced upon the peripheries of the respective elements, electric switches actuatable by said tripping means, and means for selectively connecting any one or more of said stokers electrically to the respective switches, whereby each stoker or group of stokers is operated as many times as may be desired during a given period, and their frequency of operation changed at will, said electric switches preferably being of the mercury type, such for instance, as those identified by the trade name "Mercoid."

In considering the construction and operation of this timing device, it is to be understood that the operation of mercury switches by tilting them is functionally equivalent to other forms of commutation, as, for instance, the periodic contacting of a relatively stationary brush with charged portions of a rotatable element (frequently referred to as a commutator). However, whereas the latter is affected by dust and dirt generally, and wears rapidly due to the inevitable arcing where the contacts are repeatedly broken, and especially where the current break is between slowly moving parts, the mercury switch enjoys a much longer life by reason of the rapid break and consequently reduced arcing being enclosed within at least partial vacuo, thereby practically eliminating need for considering depreciation through either arcing, dirt or corrosion. Also, the mercury switch, being a complete unit within itself, can be readily replaced if broken or otherwise necessary, and does not have to be delicately adjusted as do brushes and like, while proper timing is obtained by merely varying the number and position of the lugs or equivalent switch-tilting members carried by the respective rotatable elements.

The present invention, while originally and primarily designed for controlling all of the stokers of a single kiln simultaneously, and the groups of stokers of different kilns independently of one another, is obviously adapted for controlling the operation of various types of apparatus other than stokers associated with kilns and furnaces. It is also understood that such apparatus may be actuated by pneumatic, hydraulic, electric, or other suitable power, or by two or more of them, all electrically controlled by the same timing device. Thus, the stokers of one kiln may be actuated pneumatically, those of another hydraulically, and those of another by electric motor, solenoid, or other suitable means, while all of them are electrically connected to operate by and in accordance with the same timing device.

Figures 2, 3:
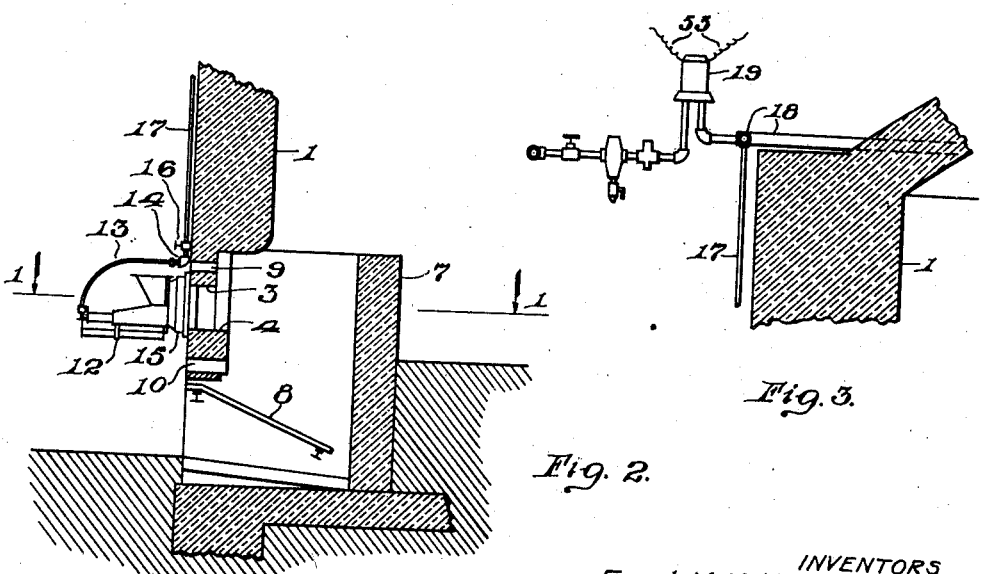

With the objects thus briefly stated, the invention comprises further details of construction and operation, which are hereinafter fully brought out in the following description, when read in conjunction with the accompanying drawings, in which Fig. 1 is a fragmentary portion of a brick kiln in horizontal section of the line 1—1 of Fig. 2; Fig. 2 is an enlarged fragmentary section of the line 2—2 of Fig. 1; Fig. 3 is a fragmentary view showing the relation of a kiln to the electric solenoid-operated valve for controlling the operation of the stokers of a given group, as for instance, those attached to a single kiln; Fig. 4 is a horizontal sectional view of the improved timing device substantially on the line 4—4 of Fig. 6, the switch-tripping lugs being indicated schematically; Fig. 5 is a partial elevation and partial vertical sectional view of said timing device; Fig. 6 is a section on the line 6—6 of Fig. 5; Fig. 7 is a front elevation of the timing device, together with a representative arangement of the electric cords or conductors by which the stokers of a given group, as those of a part or all of a given kiln, are selectively connected to a given switch and its corresponding switch-actuating or timing element; and Fig. 8 is a wiring diagram showing the connections of a single switch with its particular set of receptacles, and one of said receptacles being engaged by the flexible connection from a solenoid valve, representing the several stokers of a given kiln or other grouping of mechanisms, as may be desired.

Referring to the drawings, a portion of a kiln for firing brick, tile and other ceramic articles is shown as comprising a circular wall 1, pierced by an opening 2 through which access is had for removing fired articles and recharging the kiln with freshly formed or so-called green shapes. A series of circumferentially spaced eyes 3 or openings for firing the kiln are provided above coking shelves 4, while adjacent to and upon the inner side of each such opening is a baffle wall 7 for deflecting upwardly the hot draft from fire upon the grate 8. In the wall 1 above each eye is an aperture 9 to admit air to aid in complete combustion of unburned gases rising from the coking shelf and grate, while beneath said eye and above its grate is one or more peep holes 10, to permit viewing the condition of the fire adjacent thereto. Spent gases are drawn from the kiln by way of a series of radially spaced apertures 11 in the kiln floor, under the influence of draft caused by a chimney or stack (not shown) and submerged communicating conduits.

In order to illustrate the invention, a fluid-actuated stoker 12 is shown as being operatively mounted at each eye of the kiln, with a flexible hose or tubing 13 extending upwardly to a connection 14, which is preferably above and in substantial alignment with the axis of the door or closure 15 upon which said stoker is mounted. Thence, extending upwardly and controlled by a valve 16 is a pipe 17, which connects with a supply trunk line 18 skirting the upper portion of the kiln wall (Fig. 3) and common to all of the stokers of the kiln, if desired. Air, steam or similar fluid pressure to said trunk is regulated by any suitable form of electrically controlled valve 19, interposed between said line and a pressure source (not shown). For actuation of the stokers, if steam is used, its effectiveness is controlled in the same manner as that of air pressure. Likewise, if electricity is made use of as the motive force for said stokers, an electrically controlled relay supplants the valve 19.

Referring to Figs. 4, 5, 6, and 7, an improved control device is shown, by means of which all of the stokers of a given kiln or group of kilns are operated simultaneously and at any desired frequency, either concurrently with the operation of the stokers of another kiln or group of kilns, or entirely independently thereof. Obviously, this device can be employed to control single as well as groups of stokers, and likewise any other form or type of mechanism, either singly or in groups, that it is desired to operate periodically, rather than continuously, and at any desired frequency during a given period.

Said device comprises a casing, which is composed of a bottom wall 20, end walls 21, an abbreviated rear wall 22, and a front which includes preferably three vertically spaced horizontal strips 23, upon which are supported two horizontally arranged units 24 of electric receptacles, each unit comprising four individual receptacles 25, and said units forming with said strips and end pieces 26 a front wall or closure for said casing, which is oscillatably supported by a piano hinge 27 and is normally maintained in closed position. The upper portion of said casing is enclosed by a cover 28, which may be removed when necessary to obtain greater access to the interior of said casing and its mechanism, than is afforded by opening merely the said front wall.

A support for said casing comprises a platform 29 having an extension 30 in one direction to operatively support an electric motor 31 and a speed-reducing unit 32 preferably outside the limits of said casing. From said unit a shaft 33 extends into said casing through one end wall and is provided with a small gear 34, which meshes with and drives a larger gear 35 secured to a shaft 36 journalled in bearings supported by the end walls 21. Upon said shaft are secured a series of rotatable elements 37, which in this instance are of disc-like form, but instead may comprise spiders or in fact assume any other suitable shape. Also, they may be of any convenient width, diameter and distance apart.

In Fig. 4 the rotatable elements are shown to be ten in number and are provided, respectively with 1, 2, 3, 4, 6, 8, 12, 16, 20 and 24 tripping lugs 37' detachably secured thereto by screws or bolts 38, and may be arranged peripherally thereon in any desired number, and changed from time to time as desired, but are preferably spaced equidistant upon each of said elements. For each of said elements there is a mercury or other suitable type of switch 39, removably carried by clips 40 upon a tiltable lever 41, which is oscillatably mounted upon a bar 42 supported by brackets 43 secured to the opposite end walls 21, and with the free end of said lever extending into the path of the lugs upon any given rotatable element. When not temporarily elevated by said lugs, the levers 41 rest upon a longitudinally extending bar 41'. At the front of the device and supported by an insulating member 44 is a bus bar 45, said member and bus bar being carried by the front wall closure if desired (Fig. 4). A second bus bar 46, together with as many fuses 47 as there are switches, is supported by an insulating member 48, which extends from end to end of said casing adjacent to or directly upon the bottom wall 20. The electric element of each group, comprising a switch, a fuse and a vertical series of four receptacles, are electrically connected to one another and to said bus bars by a simple circuit (Fig. 8), which is charged by connection with a 115 volt or other suitable source of current.

The platform 29—30 may be complete in itself or may be supported by legs 49. In either case, there is secured to its forward surface a longitudinally extending plug-supporting bar 50, having spaced vertically extending bores 51 through which freely extend two-conductor flexible cords 52, equal in number to the groups of stokers or other mechanisms to be controlled by the device. The upper free end of each of said cords is provided with a two-pronged plug 53, the prongs of which are adapted to be inserted into the various receptacles 25 selectively, while the opposite end of each cord is looped downwardly and thence upwardly to the rear of said supporting bar, where the ends of the conductors of said cord are bared and secured to binding posts 54. To each of these binding posts there are also secured the two wires 55 that extend to the respective fluid pressure control valves 19 (Fig. 3). When the stokers of a given kiln or any other single group thereof, for that matter, are not in use, the corresponding plug is free from engagement with the said receptacles and rests idly upon the bar 50.

In the operation of this invention, it is assumed that a series of eight kilns has been charged with freshly molded brick or tile, and that fires have been started on the several grates, the stoker hoppers having also been supplied with fuel, and the several kilns having already run for various periods. The motor 31 is started, thereby rotating the shaft 36 and elements 37, which carry their respective lugs 37' successively past and effect a tilting upwardly of the respective levers 41 and attached mercury switches 39. The tilting of each switch closes and completes its respective circuit, so that the corresponding electromagnetic valve or valves 19 are thereby energized to open their respective valves, with the result that the reciprocating and/or other movable parts of the stokers, connected to the particular trunk pressure line supplying them and controlled by a given valve, are set in motion and thereby impel or otherwise supply fresh fuel to the coking shelves of the eyes of the corresponding kiln, and in so doing remove the previously coked fuel into the fire zones.

Assuming that kilns Nos. 2 and 8 have but just been started and that low heats are accordingly desired therein, their respective cords 52 are connected with any two of the receptacles in the first vertical column from the left (Fig. 7), so that only one feeding of fuel to the fires of said No. 2 and 8 kilns is effected during a single rotation of its switch-tripping lug 37' which may represent a twelve-hour period, for example. Kiln No. 4 having burned a day or so longer than Nos. 2 and 8 kilns, its cord is connected to a receptacle whose switch effects two firings in the same period of time. No. 5 kiln, having been burning a still longer time, has its cord connected to the fourth switch from the left, while kilns Nos. 1 and 3, having been heated for a substantially longer period, are connected to the sixth switch from the left, which provides eight firings in the same period of time. Finally, kilns Nos. 6 and 7 having attained nearly full and full temperatures, respectively, are connected to the ninth and tenth switches from the left, which in the same order effect twenty and twenty-four firings in said period. Obviously, any arrangement of the cords and thereby the stokers of the several kilns, as indicated in Fig. 7, can be varied as to number of kilns controlled by the device, the number of firings during the standard period for the stokers of each kiln, etc., when and as may be desired.

With regard to the specific construction of the device as herein described and illustrated, it should be noted that the number of rotatable elements 37 with their corresponding switches 39, the number of receptacles 25 connected to said switches, the number of cords 52 and attached plugs 53, the number and arrangement of the several lugs 37' upon the respective rotatable elements, the grouping of all of the stokers of a given kiln so as to operate in unison, or a smaller or larger number of stokers instead, and whether or not the device is employed to operate stokers rather than other and possibly entirely different mechanisms, etc., is all a matter of choice and selection, depending upon the particular requirements present, as all such variations are included within the scope of the invention as hereafter claimed.

Having thus described our invention, what we claim and desire to protect by Letters Patent of the United States is:

1. The combination of a plurality of stokers, said stokers being sub-divided into groups, the stokers of each group being adapted for operative association with the respective firing openings of a kiln, with connection between the stokers of each group whereby the stokers in each group function simultaneously, an electrically actuated device for controlling the operations of each of said groups independently of the other groups, an automatic timing device comprising a plurality of rotatable elements representing different time intervals, a switch for and operative to be actuated by each of said elements, and flexible switching means to selectively connect any one or more of said electrically actuated devices to any one of said switches, to permit instant variation in the operation of each group of stokers in accordance with any of the different time intervals represented by said elements.

2. The combination of a plurality of stokers, said stokers being sub-divided into groups, the stokers of each group being adapted for operative association with the respective firing openings of a kiln, with connections between the stokers of each group whereby the stokers in each group function simultaneously, an electrically actuated device for controlling the operations of each of said groups independently of the other groups, an automatic timing device comprising a plurality of rotatable elements, means to rotate said elements concurrently, lugs detachably carried by said elements and the distance between the lugs on each element representing different time intervals, mercury switches tiltably mounted adjacent to said elements, so as to be tilted by and upon engagement with said lugs, and flexible switching means to selectively connect any one or more of said electrically actuated devices to any one of said switches, to permit instant variation in the operation of each group of stokers in accordance with the time intervals represented by the number and position of the lugs upon each of the respective elements.

FRED M. MILLER.
ALFRED C. SHAPE.
WILLIAM H. McCLELLAND.
GORDON C. FAY.

REFERENCES CITED

The following references are of record in the file of this patent:

UNITED STATES PATENTS

| Number | Name | Date |
|---|---|---|
| 1,370,633 | Cox | Mar. 8, 1921 |
| 606,356 | Norden | June 28, 1898 |
| 2,032,037 | Auth | Feb. 25, 1936 |
| 2,110,977 | Kohout | Mar. 15, 1938 |
| 1,726,520 | Kramer | Apr. 27, 1929 |
| 1,658,049 | Howse | Feb. 7, 1928 |
| 1,663,513 | Howse | Mar. 20, 1918 |
| 1,977,024 | Temple | Oct. 16, 1934 |
| 1,725,202 | Lockett | Aug. 20, 1929 |
| 1,432,317 | Brand | Oct. 17, 1922 |
| 1,641,470 | Bell | Sept. 6, 1927 |
| 1,906,943 | Fisher | May 2, 1933 |
| 2,039,194 | Simon | Apr. 28, 1936 |
| 1,986,960 | DeGuara | Jan. 8, 1935 |
| 1,828,126 | Brown | Oct. 20, 1931 |
| 2,325,837 | Dyer | Aug. 3, 1943 |
| 2,186,964 | Foster | Jan. 6, 1940 |

FOREIGN PATENTS

| Number | Country | Date |
|---|---|---|
| 460,308 | German | May 25, 1928 |